H. G. Robertson,
Horse-Collar Machine.

No. 15,107. Patented June 10, 1856.

UNITED STATES PATENT OFFICE.

H. G. ROBERTSON, OF GREENVILLE, TENNESSEE.

MACHINE FOR STUFFING HORSE-COLLARS.

Specification of Letters Patent No. 15,107, dated June 10, 1856.

*To all whom it may concern:*

Be it known that I, H. G. ROBERTSON, of Greenville, in the county of Greene and State of Tennessee, have invented a certain new and useful Improvement in Machines for Stuffing Horse-Collars, and that the following is a full, clear, and exact description, reference being had to the accompanying drawing, which forms part of this specification, and in which—

Figure 1:
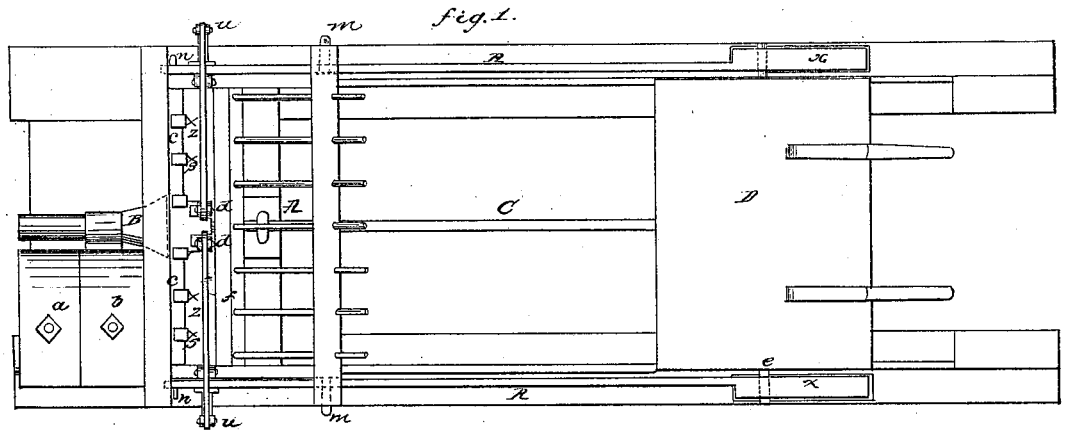
Figure 2:
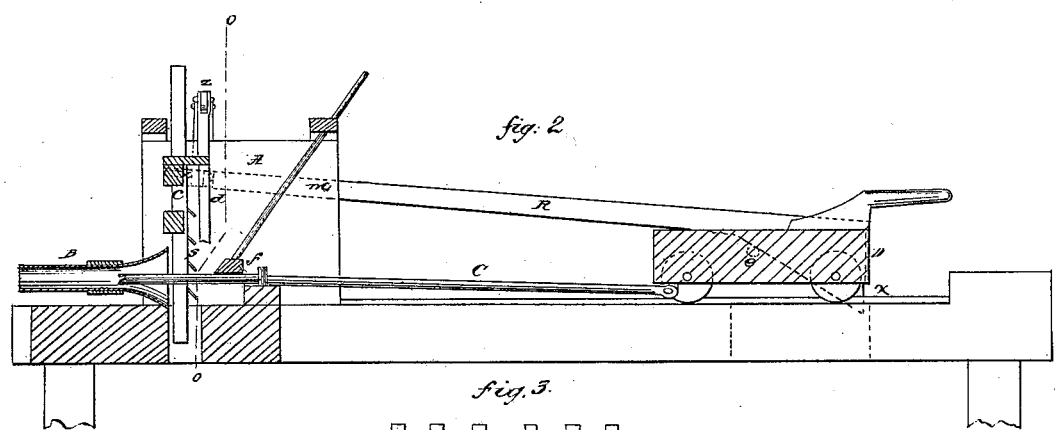
Figure 3:
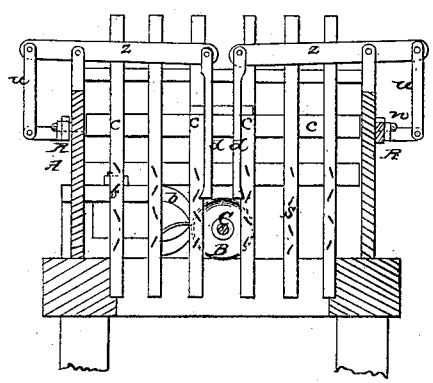

Figure 1 represents a plan of the entire machine; Fig. 2, a central longitudinal vertical section, and Fig. 3 a transverse vertical section taken as indicated by the line O O in Fig. 2.

Of the many machines which have been devised for stuffing horse collars, several of which have been patented, the principle of action, so far as a reciprocating plunger is concerned and the use of a clamp to hold the collar and of a funnel mouthed tube for directing the filling and around which each end of the collar is alternately slipped, has been in all or most of them substantially similar, and in these respects the machine represented in the accompanying drawing does not essentially differ—the straw cut in suitable lengths being placed crosswise of the machine within the hopper (A), the one end of the collar made fast by an outer clamp (*a*), the funnel mouthed filling tube (B) on and around which the other end of the collar is secured made fast by a similar inner clamp (*b*) and the reciprocating plunger or stuffing rod (C) being worked back and forth within and through the tube by a reciprocating hand carriage (D) to which the plunger is attached—all as in other machines for the same purpose, the plunger forcing the straw from the hopper each advance stroke through the filling tube into the half of the collar main rim being filled, the stroke of the plunger being shortened as the work progresses, and the collar turned for the filling of the other half of the main rim as is well known in the hand operation of such machines. In most of these machines, the feed of the straw to the plunger which works through the bottom of the hopper is effected by the weight of the straw causing its descent within the hopper on the back stroke of the plunger and which is forced forward through the filling tube into the collar on the next advance stroke of the plunger, but this method of feeding in the straw is very uncertain in its action and causes great irregularity in the filling of the collar, owing in part to the constantly varying amount of straw in the hopper, and numerous mechanical feeding devices have been tried to do away with this irregularity but in practice most of them have failed, many in not keeping the straw free and loose (so necessary to a well stuffed collar) and others in becoming clogged with straw, and this " matting " and " clogging " are prominently conspicuous in an ordinary toothed cylinder feed applied to this purpose and which was made the subject of Letters Patent, and the object of the present improvement is to effect in a simple manner a better feed in every respect for the purpose mentioned than has heretofore been devised and which as I have proved in practice does away with the evils before mentioned, which improved method or means I will now proceed to describe.

The front of the hopper (A) I make up of a vertically reciprocating rack, rail grating or it may be any other suitably constructed piece (*c*) which has a motion once up and down for each double stroke of the plunger (C), the rack ascending during the early part of the plunger's advance stroke and remaining in its raised position during the remainder of that stroke and for the greater portion of the return stroke of the plunger toward the close of which the rack is lowered and carries with it downward the straw to the bottom of the hopper furnishing a new feed to the plunger for its next advance stroke, the rack having teeth (*s*) inclining downward within to grasp and hold the straw. The ascending movement of the rack not only serves the purpose of returning the rack to a position for another downward feed at the proper time but, being in a reverse direction to said feed, it keeps the straw free and loose within the hopper and effectually prevents all " matting " and " clogging." To prevent the straw unduly rising from the bottom of the hopper by the action of the bearded or toothed rack (*c*) in the ascent of the rack, I employ one, two or more vertically reciprocating fingers or stays (*d*) which also move up and down within the hopper once for each double stroke of the plunger (C) and simultaneously with the specified movement of the rack (*c*) but in reverse directions to it, that is the fingers (*d*) descend as the rack (*c*) ascends and vice versa, and in this manner the straw is kept down from rising in a mass (the teeth of the rack though set inclined having some little tendency to produce an undue rising which the action of the fingers (*d*) however is sufficient to restrain), a steady and regular feed is kept up to the plunger and the reverse reciprocating actions of the fingers and rack keeping the straw at that degree of freedom and looseness which is found to answer best to produce a well stuffed collar and which a cylinder feed moving in but the one direction, apart from the tendency which it has to clog by winding the straw around it, never has been made to effect. The mechanical means for thus actuating the rack (*c*) and fingers (*d*) in specified relationship to the movement of the plunger (C) may be of any suitable kind, but as represented in the drawing the carriage (D) which operates the plunger is made by studs (*e*) projecting from it, toward and at the close of its back stroke, to raise the back and inclined ends (*x*) of weighted beams (R) the front ends of which, on the opposite sides of the fulcrums (*m*), are consequently lowered and acting upon studs (*n*) projecting from the rack (*c*) depress the rack, but as the carriage (D) is again moved forward the weighted inclined ends (*x*) of the beams gradually drop till the studs (*e*) of the carriage pass said inclines and in this way gradually raise the rack (*c*) and the rack is kept raised till again required to be dropped as already described. The simultaneous action of the fingers (2) with the rack, but in reverse directions to it, is shown as effected by cross beams or double levers (*z*) operated by the main beams (R) which actuate the rack, the main beams and cross beams being connected by jointed links (*u*) and so forth. The bottom strip (*f*) of the hopper may be made adjustable to vary the amount of straw fed to the plunger below.

What I claim as new and useful herein, and desire to secure by Letters Patent, is—

In combination with and specified relation to the movement of the reciprocating plunger or stuffing rod (C), the intermittently reciprocating mechanical feed formed by the bearded rack or toothed slide (*c*) and retaining fingers (*d*) operating together simultaneously in reverse directions within the hopper essentially as and for the purposes set forth.

In testimony whereof, I have hereunto subscribed my name.

H. G. ROBERTSON.

Witnesses:
A. GREGORY,
D. SMITH.